(12) United States Patent
He et al.

(10) Patent No.: US 11,457,647 B2
(45) Date of Patent: Oct. 4, 2022

(54) OIL AND FAT FOR SUPPRESSING BLOOM

(71) Applicant: FUJI OIL HOLDINGS INC., Osaka (JP)

(72) Inventors: Mogeng He, Ibaraki (JP); Naohiro Karatani, Ibaraki (JP)

(73) Assignee: FUJI OIL HOLDINGS INC., Osaka (JP)

(*) Notice: Subject to any disclaimer, the term of this patent is extended or adjusted under 35 U.S.C. 154(b) by 137 days.

(21) Appl. No.: 16/484,114

(22) PCT Filed: Jan. 9, 2018

(86) PCT No.: PCT/JP2018/000142
§ 371 (c)(1),
(2) Date: Aug. 7, 2019

(87) PCT Pub. No.: WO2018/159098
PCT Pub. Date: Sep. 7, 2018

(65) Prior Publication Data
US 2020/0022380 A1    Jan. 23, 2020

(30) Foreign Application Priority Data

Feb. 28, 2017  (JP) .............................. JP2017-037116
Oct. 12, 2017  (JP) .............................. JP2017-198775

(51) Int. Cl.
*A23D 9/06*    (2006.01)
*A23G 1/36*    (2006.01)

(52) U.S. Cl.
CPC ................. *A23D 9/06* (2013.01); *A23G 1/36* (2013.01); *A23G 2200/08* (2013.01)

(58) Field of Classification Search
CPC ... A23D 9/00; A23D 9/06; A23G 1/36; A23G 1/38; A23G 2200/08; C11C 3/00; C11C 3/12
USPC ........................................................ 426/541
See application file for complete search history.

(56) References Cited

U.S. PATENT DOCUMENTS

| | | | |
|---|---|---|---|
| 4,855,152 A | * | 8/1989 | Nakano .................. A21D 2/165 426/261 |
| 2007/0269468 A1 | * | 11/2007 | Bach ........................ C11C 3/10 424/401 |

FOREIGN PATENT DOCUMENTS

| | | |
|---|---|---|
| EP | 0495553 | 7/1992 |
| EP | 0768038 | 4/1997 |
| JP | S6356250 | 3/1988 |
| JP | S63126458 | 5/1988 |
| JP | H02-138937 | 5/1990 |
| JP | 2006271328 | 10/2006 |
| JP | 2014090695 | 5/2014 |
| JP | 2017079629 | 5/2017 |
| RU | 2555828 | 7/2015 |
| WO | 2005094598 | 10/2005 |
| WO | 2014069218 | 5/2014 |
| WO | 2016125791 | 8/2016 |
| WO | 2016136751 | 9/2016 |

OTHER PUBLICATIONS

"Search Report of Europe Counterpart Application", dated Mar. 17, 2021, pp. 1-9.
"International Search Report (Form PCT/ISA/210)" of PCT/JP2018/000142, dated Apr. 10, 2018, with English translation thereof, pp. 1-4.
Satoshi Fujita, "Edible Fats and Oils—Their Use and Fats and Oils Foods (Revised Edition)," with partial English translation thereof, Koshobo Co., Ltd., Jan. 2011, pp. 1-3.
Akio Kato, "Use of Palm Oil and Palm Kernel Oil," with partial English translation thereof, Koshobo Co., Ltd., Jul. 1990, pp. 1-4.
Satoshi Fujita, "Revised Edible Oils and Fats—Their Use and Oil and Fat Foods," with partial English translation thereof, Koshobo Co., Ltd., Jan. 2011, pp. 1-5.
"Rapeseed oil," downloaded from Wikipedia (https://ja.wikipedia.org/wiki/%E8%8F%9C%E7%A8%AE%E6%B2%B9) on Nov. 19, 2021., with partial English translation thereof, pp. 1-7.
"Office Action of India Counterpart Application" with English translation thereof, dated Jul. 25, 2021, p. 1-p. 9.
"Office Action of Indonesia Counterpart Application" with English translation thereof, dated Jul. 25, 2021, p. 1-p. 9.
"Office Action of Taiwan Counterpart Application", dated Jun. 15, 2021, with English translation thereof, pp. 1-11.

* cited by examiner

*Primary Examiner* — Jyoti Chawla
(74) *Attorney, Agent, or Firm* — JCIPRNET

(57) ABSTRACT

The present invention provides an oil and fat for suppressing bloom in a chocolate-like food product obtained by a simple method, or a chocolate-like food product in which said oil and fat is used. It was discovered that an oil and fat containing prescribed amounts of an SSU fat and extremely hardened high-erucic-acid rapeseed oil exhibits strong bloom resistance properties. Furthermore, it was confirmed that this effect is further enhanced by the combined use of a sorbitan fatty acid ester.

8 Claims, No Drawings

OIL AND FAT FOR SUPPRESSING BLOOM

CROSS-REFERENCE TO RELATED APPLICATION

This application is a 371 application of the international PCT application serial no. PCT/JP2018/000142, filed on Jan. 9, 2018, which claims the priority benefit of Japan application no. 2017-037116, filed on Feb. 28, 2017 and Japan application no. 2017-198775, filed on Oct. 12, 2017. The entirety of each of the above-mentioned patent applications is hereby incorporated by reference herein and made a part of this specification.

TECHNICAL FIELD

The present invention relates to a technique for suppressing generation of bloom in a chocolate-like food product.

BACKGROUND ART

Examples of applications regarding an anti-bloom agent include Patent Literature 1 which discloses that agents satisfying requirements such as inclusion of a predetermined amount of a predetermined mono-U-di-S-type triglyceride (SSU) are used as an anti-bloom agent. In addition, Patent Literature 2 discloses that blooming resistance at the time of slow cooling can be recognized when combining an extremely hardened high-erucic-acid rapeseed oil with a USU fat.

Patent Literature 3 is an application referred to as an "oil and fat composition containing a fat bloom inhibitor, and chocolate containing the same," and discloses that "at least one kind selected from the group consisting of glycerin organic acid fatty acid esters, polyglycerin saturated fatty acid esters, and sorbitan saturated fatty acid esters" is contained as the fat bloom inhibitor.

REFERENCE LIST

Patent Literature

Patent Literature 1:
Japanese Patent Laid-open No. H02-138937
Patent Literature 2:
PCT International Publication No. WO2016/125791
Patent Literature 3:
Japanese Patent Laid-open No. 2006-271328

SUMMARY OF INVENTION

Technical Problem

An object of the present invention is to provide an oil and fat for suppressing bloom in a chocolate-like food product, or a chocolate-like food product in which the oil and fat is used by a simple method.

Solution to Problem

The inventors of the present inventions carried out intensive studies to solve the above-described problems.

According to the examples, the anti-bloom agent disclosed in Patent Literature 1 needs to be prepared by interesterification of predetermined oils and fats and then fractionation using hexane, which makes the manufacture complicated.

Patent Literature 2 discloses a chocolate-like oil and fat composition characterized by containing 20 to 99% by mass of USU triglycerides and 1 to 20% by mass of SSS triglycerides (claim 1), and discloses that a content of SSU triglycerides is less than 5% by mass (claim 3). Also in Patent Literature 2, according to the examples, a separation operation is necessary in the preparation of a USU fat, and the preparation is complicated.

Patent Literature 3 discloses a plurality of named emulsifying agents as a fat bloom inhibitor, but all of the agents have a large number of types, and substantially which emulsifying agent show strong effects has not been disclosed sufficiently.

The inventors of the present invention conducted further intensive research. As a result, the inventors of the present invention have found that an oil and fat containing a predetermined amount of an SSU fat (S representing a saturated fatty acid having 16 to 22 carbon atoms and U representing an unsaturated fatty acid having 16 to 22 carbon atoms) and an extremely hardened high-erucic-acid rapeseed oil exhibits strong anti-bloom resistance, and therefore have completed the present invention. In addition, the inventors of the present invention have found that this effect becomes stronger by combined use of a sorbitan fatty acid ester, and therefore have completed the present invention.

In other words, the present invention relates to the following aspects.

(1) An oil and fat for suppressing bloom in a chocolate-like food product, the oil and fat containing: 1% by mass or more of an extremely hardened high-erucic-acid rapeseed oil, in which the extremely hardened high-erucic-acid rapeseed oil and an SSU-type triglyceride are contained at any ratio between 5:95 and 40:60, where S represents a saturated fatty acid having 16 to 22 carbon atoms, and U represents an unsaturated fatty acid having 16 to 22 carbon atoms.

(2) The oil and fat for suppressing bloom in a chocolate-like food product according to (1), further containing 0.5 to 5% by mass of a sorbitan fatty acid ester.

(3) A chocolate-like food product, containing 1 to 10% by mass of the oil and fat for suppressing bloom according to (1) or (2) in the chocolate-like food product.

(4) A chocolate-like food product, containing 0.1 to 10% by mass of an SSU-type triglyceride and 0.01 to 3% by mass of an extremely hardened high-erucic-acid rapeseed oil, where S represents a saturated fatty acid having 16 to 22 carbon atoms, and U represents an unsaturated fatty acid having 16 to 22 carbon atoms.

(5) The chocolate-like food product according to (4), further containing 0.01 to 0.3% by mass of a sorbitan fatty acid ester.

(6) A method for manufacturing a chocolate-like food product, including blending in of the oil and fat for suppressing bloom according to (1) or (2) such that 0.1 to 10% by mass of an SSU-type triglyceride and 0.01 to 3% by mass of an extremely hardened high-erucic-acid rapeseed oil are contained.

Advantageous Effects of Invention

According to the present invention, it is possible to obtain an oil and fat for suppressing bloom in a chocolate-like food product by a simple method.

DESCRIPTION OF EMBODIMENTS

The present invention relates to an oil and fat for suppressing bloom in a chocolate-like food product. One example of the chocolate-like food product mentioned herein is chocolate. The chocolate mentioned herein include not only chocolate, quasi chocolate, and chocolate-utilizing food products which are defined by The Fair Trade Council of the National Chocolate Industry and The Fair Trade Council of Chocolate-Utilizing Food Products, but also products that contain oils and fats as essential ingredients, and in which auxiliary raw materials are blended in at arbitrary proportions as necessary, such as saccharides, powdered milk, cocoa raw materials (cocoa mass, cocoa, cocoa butter), fruit juice powders, fruit powders, flavoring agents, emulsifying agents, flavors, and coloring agents.

Typical examples of chocolate include sweet chocolate, milk chocolate, and white chocolate. Examples thereof further include strawberry chocolate and the like to which fruit components are added to the above examples.

The oil and fat for suppressing bloom referred to in the present invention is an oil and fat having an effect of suppressing generation of bloom in a case where the oil and fat for suppressing bloom is used in the chocolate-like food product. A specific evaluation method is described in the examples.

It is preferable that 1 to 10% by mass of the oil and fat for suppressing bloom be contained in the chocolate-like food product. An amount thereof is more preferably 1 to 8% by mass, and is even more preferably 1.5 to 6% by mass. The generation of bloom in the chocolate-like food product can be efficiently suppressed by incorporating an appropriate amount of the oil and fat for suppressing bloom in the chocolate-like food product.

The oil and fat for suppressing bloom according to the present invention is required to contain 1% by mass or more of an extremely hardened high-erucic-acid rapeseed oil. An amount thereof is more preferably 1.5 to 15% by mass, and is even more preferably 2.5 to 14% by mass. The generation of bloom in the chocolate-like food product can be efficiently suppressed by incorporating an appropriate amount of the extremely hardened high-erucic-acid rapeseed oil.

In the present invention, it is necessary to incorporate the extremely hardened high-erucic-acid rapeseed oil and an SSU-type triglyceride at any ratio between 5:95 and 40:60. The ratio is more preferably 7:93 to 35:65, and is even more preferably 9:91 to 30:70. The generation of bloom in the chocolate-like food product can be efficiently suppressed by incorporating the extremely hardened high-erucic-acid rapeseed oil and the SSU-type triglyceride at an appropriate ratio. S represents a saturated fatty acid having 16 to 22 carbon atoms, and U represents an unsaturated fatty acid having 16 to 22 carbon atoms.

The oil and fat for suppressing bloom according to the present invention preferably contains 0.5 to 5% by mass of a sorbitan fatty acid ester. An amount thereof is more preferably 0.7 to 4.5% by mass, and is even more preferably 1 to 4% by mass.

As the sorbitan fatty acid ester, a sorbitan saturated fatty acid ester is preferable. The sorbitan fatty acid ester is more preferably one or more kinds selected from sorbitan tristearate and sorbitan tribehenate, and is more preferably sorbitan tristearate.

By adding an appropriate amount of an appropriate sorbitan fatty acid ester, the bloom-suppressing effect is dramatically enhanced.

When considered from the chocolate-like food product of the present invention, it is preferable to incorporate 0.1 to 10% by weight of the SSU-type triglyceride and 0.01 to 3% by weight of the extremely hardened high-erucic-acid rapeseed oil in order to suppress generation of bloom in the chocolate-like food product. An amount of the SSU-type triglyceride is more preferably 0.2 to 5% by mass, and is even more preferably 0.3 to 1.5% by mass. In addition, an amount of the extremely hardened high-erucic-acid rapeseed oil is more preferably 0.02 to 1% by mass, and is even more preferably 0.05 to 0.2% by mass. It is obvious that a ratio of these amounts is preferably any ratio between 5:95 and 30:70 of the extremely hardened high-erucic-acid rapeseed oil to the SSU-type triglyceride.

In the chocolate-like food product, the generation of bloom in the chocolate-like food product can be efficiently suppressed by incorporating an appropriate amount of the extremely hardened high-erucic-acid rapeseed oil and the SSU-type triglyceride.

The SSU-type triglyceride is a triglyceride containing two saturated fatty acids having 16 to 22 carbon atoms and one unsaturated fatty acid having 16 to 22 carbon atoms, and the unsaturated fatty acids having 16 to 22 carbon atoms are present in the 1-position or the 3-position.

An amount of sorbitan fatty acid esters in the chocolate-like food product is preferably 0.01 to 0.3% by mass, is more preferably 0.02 to 0.27% by mass, and is even more preferably 0.05 to 0.23% by mass.

The type of sorbitan fatty acid ester is the same as that in the oil and fat for suppressing bloom.

By adding an appropriate amount of an appropriate sorbitan fatty acid ester, bloom is effectively suppressed in the chocolate-like food product.

Examples are shown below.

EXAMPLES

Examination 1

A sample was prepared according to the formulation in Table 1. A preparation method was performed according to a "0 Preparation method of sample of oil and fat for suppressing bloom."

The effect of suppressing bloom generation of the obtained sample was evaluated. A method was performed according to a "0 Evaluation method of effect of suppressing bloom generation."

The obtained results are shown in Table 2. In addition, amounts (calculated values) of an SSU-type triglyceride and an extremely hardened high-erucic-acid rapeseed oil in the obtained samples (a chocolate-like food product) are shown in Table 3.

TABLE 1

| | | Formulation | | | | | | |
|---|---|---|---|---|---|---|---|---|
| | SSU amount | Comparative Example 1 | Comparative Example 2 | Comparative Example 3 | Comparative Example 4 | Comparative Example 5 | Example 1 | Example 2 |
| Cocoa butter | 0.0 | 100.0 | — | — | 96.0 | — | — | — |
| Oil and fat 1 | 32.6 | — | 100.0 | — | — | — | 96.0 | — |
| Extremely hardened high-erucic-acid rapeseed oil | 0.0 | — | — | — | 4.0 | — | 4.0 | 4.0 |
| Oil and fat 2 | 21.2 | — | — | — | — | 100.0 | — | 96.0 |
| Total | — | 100.0 | 100.0 | 100.0 | 100.0 | 100.0 | 100.0 | 100.0 |
| SSU amount in formulation | — | — | 32.6 | 27.2 | — | 21.2 | 31.3 | 20.4 |

TABLE 1-continued

| | | | | | | | | |
|---|---|---|---|---|---|---|---|---|
| | | Formulation | | | | | | |
| Percentage | Extremely hardened high-erucic-acid rapeseed oil | — | — | — | — | 100.0 | — | 11.3 | 16.4 |
| | SSU | — | — | 100.0 | 100.0 | — | 100.0 | 88.7 | 83.6 |

| | SSU amount | Example 3 | Example 4 | Example 5 | Example 6 | Example 7 | Example 8 |
|---|---|---|---|---|---|---|---|
| Oil and fat 1 | 32.6 | — | — | — | 94.0 | 92.0 | 90.0 |
| Extremely hardened high-erucic-acid rapeseed oil | 0.0 | 4.0 | 4.0 | 4.0 | 6.0 | 8.0 | 10.0 |
| Oil and fat 2 | 21.2 | 48.0 | — | — | — | — | — |
| Oil and fat 3 | 0.0 | 48.0 | 30.0 | — | — | — | — |
| Oil and fat 4 | 18.4 | — | 66.0 | 96.0 | — | — | — |
| Total | — | 100.0 | 100.0 | 100.0 | 100.0 | 100.0 | 100.0 |
| SSU amount in formulation | — | 10.2 | 12.1 | 17.7 | 30.6 | 30.0 | 29.3 |
| Percentage Extremely hardened high-erucic-acid rapeseed oil | — | 28.2 | 24.8 | 18.5 | 16.4 | 21.1 | 25.4 |
| SSU | — | 71.8 | 75.2 | 81.5 | 83.6 | 78.9 | 74.6 |

(A unit in the formulation is % by mass)

As cocoa butter, "Cacao butter 201" manufactured by FUJI OIL CO., LTD., which is cocoa butter was used.

As an oil and fat 1, "Melano NT-R" manufactured by FUJI OIL CO., LTD. was used. This oil and fat was a not-tempered hard butter composed of an interesterified and fractionated oil containing palm as a main component, and was an oil and fat containing a large amount of SSU.

An oil and fat 2 was an interesterified oil and fat which was obtained by performing random interesterification of a combined oil including 90% by mass of a high-oleic sunflower oil and 10% by mass of an extremely hardened rapeseed oil with sodium methylate, and which contained a predetermined amount of SSU.

As an oil and fat 3, "Melano SS-400" manufactured by FUJI OIL CO., LTD., which is a tempered-type hard butter, was used.

As an oil and fat 4, an interesterified oil and fat which was obtained by performing random interesterification of a high-oleic sunflower oil with sodium methylate, and which contained a predetermined amount of SSU was used.

An amount of SSU of the oil and fat 1 was measured by a "0 Method 1 for measuring SSU amount."

An amount of SSU of the oil and fat 2, the oil and fat 3, and the oil and fat 4 was measured by a "0 Method 2 for measuring SSU amount."

Preparation Method of Sample of Oil and Fat for Suppressing Bloom

1. According to the formulation, an oil and fat part used and an emulsifying agent were melted at 50 to 60° C.
2. Each of oil and fat parts was mixed in according to the formulation, and gently stirred such that they became uniformized.

Evaluation Method of Effect of Suppressing Bloom Generation 1) 3% by mass of a sample oil and fat was added to 97% by mass of "Sweet chocolate E" manufactured by FUJI OIL CO., LTD., which is chocolate dough, and the mixture were melted at 50 to 60° C. and mixed. The "Sweet chocolate E" did not contain SSU nor an extremely hardened high-erucic-acid rapeseed oil.
2) A temperature was adjusted to 31° C.
3) 0.2% by mass of "Chocoseed A" manufactured by FUJI OIL CO., LTD. was added to the chocolate and tempered.
4) A mold was filled, cooled at 10° C. for 30 minutes, and then demolded.
5) After aging for 1 week at 20° C., storage was performed under temperature cycles (17 to 30.5° C.) every 1 day. (Temperature decrease to 17° C. for 2 h→10 h at 17→temperature increase to 30.5° C. for 2 h→10 h at 30.5° C.6→)
6) Generation of bloom on a surface of the chocolate was checked every day, and the number of days until the generation of bloom was confirmed was recorded. The number of days until the generation of the bloom was confirmed of 26 days or longer after the start of the temperature cycle was considered as a pass level.

TABLE 2

| | Results | | | | | | |
|---|---|---|---|---|---|---|---|
| | Comparative Example 1 | Comparative Example 2 | Comparative Example 3 | Comparative Example 4 | Comparative Example 5 | Example 1 | Example 2 |
| Number of days until generation of bloom was confirmed (days) | 11 | 23 | 25 | 18 | 19 | 36 | 36 |

| | Example 3 | Example 4 | Example 5 | Example 6 | Example 7 | Example 8 |
|---|---|---|---|---|---|---|
| Number of days until generation of bloom was confirmed (days) | 27 | 26 | 31 | 31 | 32 days or longer | 32 days or longer |

TABLE 3

Amount of SSU-type triglyceride and extremely hardened
high-erucic-acid rapeseed oil in chocolate-like food product

|  | Comparative Example 1 | Comparative Example 2 | Comparative Example 3 | Comparative Example 4 | Comparative Example 5 | Example 1 | Example 2 |
|---|---|---|---|---|---|---|---|
| SSU-type triglyceride | — | 0.98 | 0.82 | — | 0.64 | 0.94 | 0.61 |
| Extremely hardened high-erucic-acid rapeseed oil | — | — | — | 0.12 | — | 0.12 | 0.12 |

|  | Example 3 | Example 4 | Example 5 | Example 6 | Example 7 | Example 8 |
|---|---|---|---|---|---|---|
| SSU-type triglyceride | 0.31 | 0.36 | 0.53 | 0.92 | 0.90 | 0.88 |
| Extremely hardened high-erucic-acid rapeseed oil | 0.12 | 0.12 | 0.12 | 0.18 | 0.24 | 0.30 |

(A unit in the formulation is % by mass)

Method 1 for Measuring SSU Amount

Measurement was performed by using HPLC under the following conditions.

Device: "UltiMate 3000" manufactured by Thermo Fisher Scientific
Column: "Meteoric Core C18" manufactured by YMC CO., LTD. was used.
Column oven temperature: 5° C.
Detector: Charged particle detector (CAD)
Mobile phase: Acetonitrile, acetone, tetrahydrofuran
Flow rate: 0.4 ml/min Method 2 for Measuring SSU Amount Measurement was performed by using HPLC under the following conditions.

Device: High-performance liquid chromatography instrument manufactured by Shimadzu Corporation
Column: ODS "LICHROSORB RP18-5" manufactured by Chemco Plus Scientific Co., Ltd. was used.
Column temperature: 25° C.
Detector: Differential refractometer
Eluent: acetone/acetonitrile =80/20
Liquid volume: 0.9 ml/min Conclusions In Comparative Example 2 containing 32.6% by mass of SSU, which is known to have the effect of suppressing bloom generation in the related art, the number of days until bloom was confirmed was relatively long, but Comparative Example 2 did not pass the examination.

In Example 1 according to the present invention, despite the fact that the amount of SSU was the same as that of Comparative Example 2, the number of days until generation of the bloom was confirmed could be greatly extended by using the extremely hardened high-erucic-acid rapeseed oil in combination.

In the case of simply adding the extremely hardened high-erucic-acid rapeseed oil to cocoa butter, it was not possible to extend the number of days until generation of bloom was confirmed to a pass level (Comparative Example 4).

Examination 2

An effect of using an emulsifying agent in combination was verified.

A sample was prepared according to the formulation in Table 4. A preparation method was performed according to the "0 Preparation method of sample of oil and fat for suppressing bloom."

The effect of suppressing bloom generation of the obtained sample was evaluated. A method was performed according to a "0 Evaluation method 2 of effect of suppressing bloom generation."

The obtained results are shown in Table 5. In addition, amounts (calculated values) of an SSU-type triglyceride and an extremely hardened high-erucic-acid rapeseed oil in the obtained sample (a chocolate-like food product) are shown in Table 6.

TABLE 4

|  | SSU amount | Comparative Example 2-1 | Comparative Example 2-2 | Example 2-1 | Example 2-2 | Example 2-3 | Example 2-4 | Example 2-5 | Example 2-6 |
|---|---|---|---|---|---|---|---|---|---|
| Cocoa butter | — | 100 | 97 | — | — | — | — | — | — |
| Oil and fat 2 | 21.2 | — | — | 48 | 46.5 | 40 | — | — | — |
| Extremely hardened high-erucic-acid rapeseed oil | 0 | — | — | 4 | 4 | 4 | 4 | 4 | 4 |
| Oil and fat 3 | 0 | — | — | 48 | 46.5 | 53 | 53 | 56 | 53 |
| Oil and fat 4 | 18.4 | — | — | — | — | — | 40 | 40 | 40 |
| Sorbitan tristearate | — | — | 3 | — | 3 | 3 | 3 | — | — |
| Sorbitan tribehenate | — | — | — | — | — | — | — | — | 3 |
| Total | — | 100 | 100 | 100 | 100 | 100 | 100 | 100 | 100 |
| SSU amount in formulation | — | — | — | 10.18 | 9.858 | 8.48 | 7.36 | 7.36 | 7.36 |
| Percentage Extremely hardened high-erucic-acid rapeseed oil | — | — | — | 28.2 | 28.9 | 32.1 | 35.2 | 35.2 | 35.2 |
| SSU | — | — | — | 71.8 | 71.1 | 67.9 | 64.8 | 64.8 | 64.8 |

(A unit in the formulation is % by mass)

As cocoa butter, "Cacao butter 201" manufactured by FUJI OIL CO., LTD., which is cocoa butter was used.

TABLE 5

Results

|  | Comparative Example 2-1 | Comparative Example 2-2 | Example 2-1 | Example 2-2 | Example 2-3 | Example 2-4 | Example 2-5 | Example 2-6 |
|---|---|---|---|---|---|---|---|---|
| Number of days until generation of bloom was confirmed (days) | 7 | 7 | 21 | 28 | 28 | 20 | 17 | 19 |

TABLE 6

Amount of SSU-type triglyceride, extremely hardened high-erucic-acid rapeseed oil, and sorbitan fatty acid ester in chocolate-like food product

|  | Comparative Example 2-1 | Comparative Example 2-2 | Example 2-1 | Example 2-2 | Example 2-3 | Example 2-4 | Example 2-5 | Example 2-6 |
|---|---|---|---|---|---|---|---|---|
| SSU-type triglyceride | — | — | 0.31 | 0.30 | 0.25 | 0.22 | 0.22 | 0.22 |
| Extremely hardened high-erucic-acid rapeseed oil | — | — | 0.12 | 0.12 | 0.12 | 0.12 | 0.12 | 0.12 |
| Sorbitan fatty acid ester | — | — | — | 0.09 | 0.09 | 0.09 | — | 0.09 |

(A unit in the formulation is % by mass)

An oil and fat 2 was an interesterified oil and fat which was obtained by performing random interesterification of a combined oil including 90% by mass of a high-oleic sunflower oil and 10% by mass of an extremely hardened rapeseed oil with sodium methylate, and which contained a predetermined amount of SSU.

As an oil and fat 3, "Melano SS-400" manufactured by FUJI OIL CO., LTD., which is a tempered-type hard butter, was used.

As an oil and fat 4, an interesterified oil and fat which was obtained by performing random interesterification of a high-oleic sunflower oil with sodium methylate, and which contained a predetermined amount of SSU was used.

As sorbitan tristearate, "POEM S-65V" manufactured by RIKEN VITAMIN Co., Ltd. was used.

As sorbitan tribehenate, "POEM B-150" manufactured by RIKEN VITAMIN Co., Ltd. was used.

Evaluation Method 2 of Effect of Suppressing Bloom Generation 1) 3% by mass of a sample oil and fat was added to 97% by mass of "Sweet chocolate E" manufactured by FUJI OIL CO., LTD., which is chocolate dough, and the mixture were melted at 50 to 60° C. and mixed. The "Sweet chocolate E" did not contain SSU nor an extremely hardened high-erucic-acid rapeseed oil.

2) A temperature was adjusted to 31° C.

3) 0.2% by mass of "Chocoseed A" manufactured by FUJI OIL CO., LTD. was added to the chocolate and tempered.

4) A mold was filled, cooled at 10° C. for 30 minutes, and then demolded.

5) After aging for 1 week at 20° C., storage was performed under temperature cycles (20 to 32° C.) every 1 day. (Temperature decrease to 20° C. for 2 h→10 h at 20° C.→temperature increase to 32° C. for 2 h→10 h at 32° C.→)

6) Generation of bloom on a surface of the chocolate was checked every day, and the number of days until the generation of bloom was confirmed was recorded. The number of days until the generation of the bloom was confirmed of 17 days or longer after the start of the temperature cycle was considered as a pass level.

Conclusions

As shown in Tables 5 and 6, in the system to which the sorbitan fatty acid ester was added, the number of days until bloom was confirmed was further extended, and the effect of suppressing bloom generation was shown to be higher.

What is claimed is:

1. An oil and fat for suppressing bloom in a chocolate-like food product, the oil and fat comprising:
    1% by mass or more of an extremely hardened high-erucic-acid rapeseed oil without being interesterified,
    wherein the extremely hardened high-erucic-acid rapeseed oil and an SSU-type triglyceride are contained at any ratio between 5:95 and 40:60,
    wherein the SSU-type triglyceride contains two saturated fatty acids having 16 to 22 carbon atoms and one unsaturated fatty acid having 16 to 22 carbon atoms, and the unsaturated fatty acid having 16 to 22 carbon atoms is present in the 1-position or the 3-position.

2. The oil and fat for suppressing bloom in a chocolate-like food product according to claim 1, further comprising 0.5 to 5% by mass of a sorbitan fatty acid ester.

3. A chocolate-like food product, comprising 1 to 10% by mass of the oil and fat for suppressing bloom according to claim 2 in the chocolate-like food product.

4. A method for manufacturing a chocolate-like food product, comprising blending in of the oil and fat for suppressing bloom according to claim 2 such that 0.1 to 10% by mass of an SSU-type triglyceride and 0.01 to 3% by mass of an extremely hardened high-erucic-acid rapeseed oil are contained.

5. A chocolate-like food product, comprising 1 to 10% by mass of the oil and fat for suppressing bloom according to claim 1 in the chocolate-like food product.

6. A chocolate-like food product comprising oil and fat for suppressing bloom according to claim 1, comprising 0.1 to 10% by mass of an SSU-type triglyceride and 0.01 to 3% by mass of an extremely hardened high-erucic-acid rapeseed oil without being interesterified, wherein the SSU-type triglyceride contains two saturated fatty acids having 16 to 22 carbon atoms and one unsaturated fatty acid having 16 to 22 carbon atoms, and the unsaturated fatty acid having 16 to 22 carbon atoms is present in the 1-position or the 3-position.

7. The chocolate-like food product according to claim 6, further comprising 0.01 to 0.3% by mass of a sorbitan fatty acid ester.

8. A method for manufacturing a chocolate-like food product, comprising blending in of the oil and fat for suppressing bloom according to claim 1 such that 0.1 to 10% by mass of an SSU-type triglyceride and 0.01 to 3% by mass of an extremely hardened high-erucic-acid rapeseed oil are contained.

\* \* \* \* \*